(12) United States Patent
Rehm et al.

(10) Patent No.: US 10,472,008 B2
(45) Date of Patent: Nov. 12, 2019

(54) SYSTEM AND METHOD FOR INDUCING MOTION IN A ROLLING ROBOT USING A DUAL TELESCOPING LINEAR ACTUATOR

(71) Applicant: The Board of Regents for Oklahoma State University, Stillwater, OK (US)

(72) Inventors: Kelly Rehm, Bolivar, MO (US); Michael Gerald Puopolo, Flushing, MI (US)

(73) Assignee: THE BOARD OF REGENTS FOR OKLAHOMA STATE UNIVERSITY, Stillwater, OK (US)

(*) Notice: Subject to any disclaimer, the term of this patent is extended or adjusted under 35 U.S.C. 154(b) by 237 days.

(21) Appl. No.: 15/567,782

(22) PCT Filed: Apr. 20, 2016

(86) PCT No.: PCT/US2016/028495
§ 371 (c)(1),
(2) Date: Oct. 19, 2017

(87) PCT Pub. No.: WO2016/172248
PCT Pub. Date: Oct. 27, 2016

(65) Prior Publication Data
US 2018/0118292 A1 May 3, 2018

Related U.S. Application Data

(60) Provisional application No. 62/150,076, filed on Apr. 20, 2015.

(51) Int. Cl.
*G06F 19/00* (2018.01)
*B62D 57/02* (2006.01)
(Continued)

(52) U.S. Cl.
CPC ......... *B62D 57/022* (2013.01); *A63H 33/005* (2013.01); *B60B 3/001* (2013.01);
(Continued)

(58) Field of Classification Search
CPC .......... A63H 33/005; B60B 9/28; B60B 19/04
See application file for complete search history.

(56) References Cited

U.S. PATENT DOCUMENTS 1,936,596 A  11/1933  Goebert
3,534,955 A  10/1970  Wieland
(Continued)

OTHER PUBLICATIONS

PCT/US2016/028495, International Search Report and Written Opinion, dated Jul. 12, 2016, Inventor(s): Rehm, et al., Title: "System and Method for Inducing Motion in a Rolling Robot Using a Dual Telescoping Linear Actuator".

*Primary Examiner* — Muhammad S Islam
(74) *Attorney, Agent, or Firm* — Crowe & Dunlevy; Terry L. Watt (57) ABSTRACT

An embodiment is developed for a cylindrically shaped, elliptical rolling robot that has the ability to morph its outer surface as it rolls. The morphing actuation alters lengths of the major and minor axes, resulting in a torque imbalance that rolls the robot along faster or brakes its motion. A control scheme is implemented, whereby angular position and horizontal velocity are used as feedback to trigger and define morphing actuation. A goal of the control scheme is to cause the robot to follow a given velocity profile comprised of steps and ramps. Equations of motion for the rolling robot are formulated, which include rolling resistance torque caused by deformation of the outer surface tread. A computer program solves the equations of motion, and resulting plots show that by automatically morphing its shape in a periodic fashion, the rolling robot is able to
(Continued)

commence from an initial position, achieve constant average velocity and slow itself.

14 Claims, 5 Drawing Sheets

(51) Int. Cl.
| | | |
|---|---|---|
| *B60B 9/28* | (2006.01) | |
| *B60B 19/00* | (2006.01) | |
| *B62D 57/00* | (2006.01) | |
| *B66F 3/10* | (2006.01) | |
| *A63H 33/00* | (2006.01) | |
| *B60B 3/00* | (2006.01) | |
| *B60B 19/02* | (2006.01) | |
| *B60B 19/04* | (2006.01) | |

(52) U.S. Cl.
CPC ................ *B60B 3/002* (2013.01); *B60B 9/28* (2013.01); *B60B 19/00* (2013.01); *B60B 19/02* (2013.01); *B60B 19/04* (2013.01); *B62D 57/00* (2013.01); *B66F 3/10* (2013.01); *B60Y 2200/40* (2013.01); *B60Y 2200/80* (2013.01)

(56) References Cited

U.S. PATENT DOCUMENTS

| | | | |
|---|---|---|---|
| 4,550,626 A | | 11/1985 | Brouwer |
| 5,482,409 A | * | 1/1996 | Dunning ................. B23Q 3/18 |
| | | | 408/1 R |
| 6,414,457 B1 | | 7/2002 | Agrawal et al. |
| 8,041,456 B1 | * | 10/2011 | Blackwell ............. B25J 9/1674 |
| | | | 318/568.12 |
| 8,788,130 B1 | | 7/2014 | Tran et al. |

* cited by examiner

SYSTEM AND METHOD FOR INDUCING MOTION IN A ROLLING ROBOT USING A DUAL TELESCOPING LINEAR ACTUATOR

CROSS REFERENCE TO RELATED APPLICATIONS

This application claims the benefit of U.S. Provisional Patent Application Ser. No. 62/150,076 filed on Apr. 20, 2015, and incorporates said provisional application by reference into this document as if fully set out at this point.

TECHNICAL FIELD

This disclosure relates generally to rolling robots and, more particularly, to control of velocity of a cylindrical rolling robot by surface morphing.

BACKGROUND

A rolling robot is defined as one that rolls exclusively on an outer driven surface that entirely envelopes the robot. Rolling robots, whether spherical or cylindrical in form, have several advantages over traditional wheeled robots and walking robots. The outer surface of a rolling robot inhibits the possibility of tipping over on a side from which the robot cannot recover. It also provides mechanical and environmental protection for the robot's vulnerable systems. The outer surface is typically large in diameter and can therefore act as an effective traction device for traversing paths of varied terrains and can even be equipped to jump and bounce over otherwise insurmountable obstacles. They show promise as benefitting from lightweight adaptive materials that can be actuated like a muscle by charging them with electricity, such as nitinol.

Others have investigated motion of a notional rolling robot composed of six SuperBot modules connected end-to-end in a loop configuration. The robot had the capability to retain two shapes—a regular hexagon and a deformed hexagon with a tip-over tendency. Using orientation of the robot's modular sections with respect to the vertical as feedback, model simulation predicted the robot could roll along by automatically switching between its two allowable shapes. Simulation results mirrored those of the Tetrobot. However, this work was progressive because it demonstrated capability of a loop-shaped robot to perform shape-induced dynamic rolling with feedback control.

Another shape-changing rolling robot has been developed that resembles a tiny bicycle wheel with a deformable outer surface that was supported by several spokes made of a shape memory alloy. When a few of the spokes were passed with electric current, they contracted and deformed the outer surface into an elliptical shape. By repeatedly applying current to successive spokes, researchers produced a slow but steady crawling motion. Locomotion of this robot was not categorized as dynamic.

Heretofore, as is well known in the rolling robot arts there has been a need for an invention to that is designed to overcome the disadvantages of prior art approaches. Accordingly it should now be recognized, as was recognized by the present inventors, that there exists, and has existed for some time, a very real need for a system that would address and solve the above-described and other problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

Figure 1A:
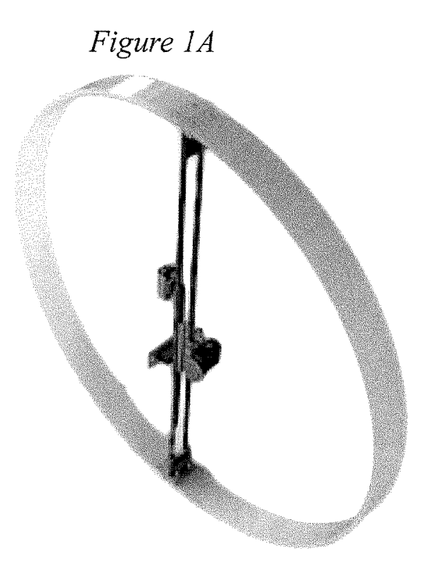
FIGS. 1A and 1B contain embodiments of a rolling robot showing the cylindrical-shaped, elliptical outer surface and the linear actuating spoke that extends from side to side along the elliptical axis.
Figure 1B:
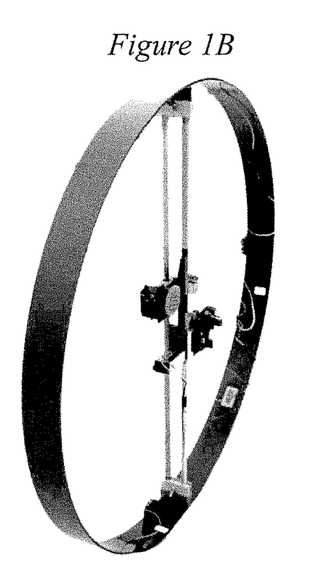

An embodiment comprises motion control of a notional rolling robot as is pictured in FIG. 1 that is simpler in design than other modular rolling robots available heretofore. An embodiment robot outer surface is continuous and flexible and can be periodically morphed into the shape of a circular or elliptic cylinder using a single servomotor. As a specific example, smaller embodiments could be powered by a single 9 v battery that would be sufficient for dozens of rolls. Additionally, this embodiment of the rolling robot performs autonomous velocity control relative to a desired profile by using onboard sensing of angular position and velocity.

When configured as an upright ellipse, traction and gravity forces generate torque about the robot's center, causing the robot to simultaneously roll and fall, similar to the motion of an egg when placed on end. Once in motion, the robot repeatedly and automatically morphs its outer surface in order to continue rolling forward or slow down. A closed-loop control system is taught herein, which uses the robot's angular position and horizontal or angular velocity as feedback to strategically change the robot's outer surface eccentricity, causing the robot to follow a given desired velocity profile. An embodiment presented herein builds upon the work of past researchers by investigating velocity control of a shape-induced dynamic rolling robot with a continuous outer surface. Equations of motion for the notional robot are formulated and solved using a numerical algorithm in which the robot is modeled to roll being shape-induced, locomotion of this robot is categorized as dynamic, meaning it will exhibit inertial motion after input has stopped. In other words, if the outer surface suddenly stops changing shape, the robot might require significant time to stop rolling. Shape-induced, dynamic rolling has been investigated and implemented using the modular robot platform.

Figure 13:
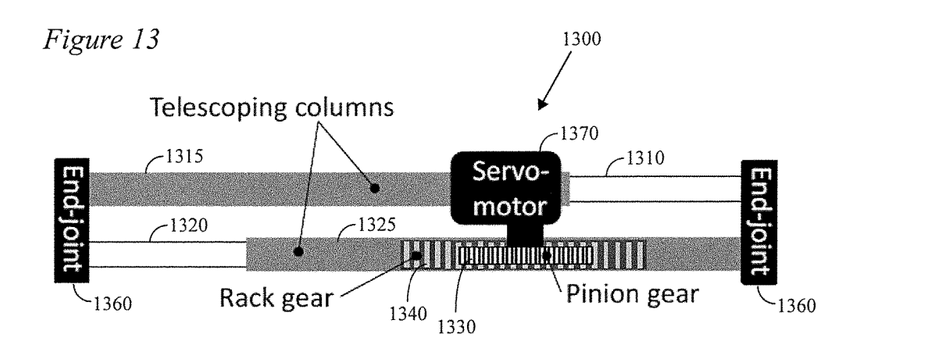
FIG. 13 contains a schematic illustration of a top view of a dual telescoping linear actuator according to an embodiment.

According to an embodiment, this invention utilizes an actuating mechanism that executes linear motion for push/pull applications (FIG. 13). The mechanism is composed of an actuator and two parallel, telescoping columns. The actuator is fixed to one of the columns and moves the other column relative to itself by means of a gear set or other transmission, such that both telescoping columns elongate or contract at the same rate. The column design resists forces/torque that would cause lateral motion. Also, the column design allows large distance actuation sans belts or pulleys. Motion is controlled via control of the actuator, which could be a DC servo motor. This invention would be especially useful in robotics and manufacturing applications that require lightweight, controlled, large-magnitude linear actuation.

According to an embodiment, the robot's outer surface is flexible and can be morphed to retain the shape of a circular or elliptic cylinder. When configured as an upright ellipse, traction and gravity forces generate torque about the robot's center, causing the robot to simultaneously fall and roll, similar to the motion of a cam or egg when placed on end. Once in motion, the robot repeatedly and automatically morphs its outer surface in order to continue rolling forward or slow down. In addition to being shape-induced, locomotion of this robot is categorized as dynamic, meaning it will exhibit inertial motion after input has stopped. In other words, if the outer surface suddenly stops changing shape, the robot might require significant time to stop rolling.

According to an embodiment, there is provided herein a rolling robot, comprising: a flexible hollow cylindrical shell, said shell having an interior; a dual telescoping linear actuator positioned within said shell, said linear actuator comprising a telescoping rack column having a first end and a second end, said rack column having a rack gear attached thereto, said rack column spanning said interior of said shell, said first and second rack column ends being in mechanical communication with said shell, a telescoping pinion column having a first end and a second end, said pinion column, said pinion column spanning said interior of said shell, said first and second pinion column ends being in mechanical communication with said shell, a pinion gear positioned to engage said rack gear, and, a servomotor in mechanical communication with said pinion gear and with said pinion column, said servomotor at least for rotating said pinion gear to extend and contract said linear actuator; a first sensor for measuring an angular position of said shell; a second sensor for measuring a velocity of said shell; and, a CPU in electrical communication with said first sensor, said second sensor, and said servomotor, said CPU reading signals from said first and second sensors and using said signals to direct said servomotor to expand or contract said linear actuator, thereby altering a shape of said cylindrical shell to effect lateral motion.

According to another embodiment there is disclosed herein a dual telescoping linear actuator, comprising a telescoping rack column having a first end and a second end, wherein said first end of said rack column terminates in a first end-joint, said second end of said rack column terminates in a second end-joint, and said rack column has a rack gear attached thereto; a telescoping pinion column parallel to said rack column, said pinion column having a first end and a second end, wherein said first end of said pinion column terminates in said first end-joint, said second end of said pinion column terminates in said second end-joint; a pinion gear positioned to engage said rack gear, and, a servomotor in mechanical communication with said pinion gear and with said pinion column, said servomotor at least for rotating said pinion gear to extend and contract said linear actuator.

There is also taught herein a method of altering a movement condition of a rolling robot having a flexible elliptical exterior shell, said shell having two changeable elliptical axes associated therewith, comprising the steps of: determining an angular position of said rolling robot with respect to said elliptical axes; determining an angular velocity of said rolling robot; using said angular position and said angular velocity to change a length of each of said two elliptical axes to create a torque imbalance in said robot, thereby changing said movement condition of said rolling robot.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 2 contains an embodiment of a schematic illustration of a rolling robot model composed of an elliptical outer surface and a point mass fixed at the robot's center of gravity. The ellipse rolls along X in the laboratory-fixed, horizontal-vertical plane, XY. Coordinate frame AB is fixed to the ellipse. The dashed arrow represents actuation of the robot's spoke that shortens/elongates a.

14A, as the pinion gear turns counterclockwise, the telescoping columns push-out against the other surface. In FIG. 14B, as the pinion turns clockwise, the telescoping columns squeeze the outer surface together.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Figure 14A:
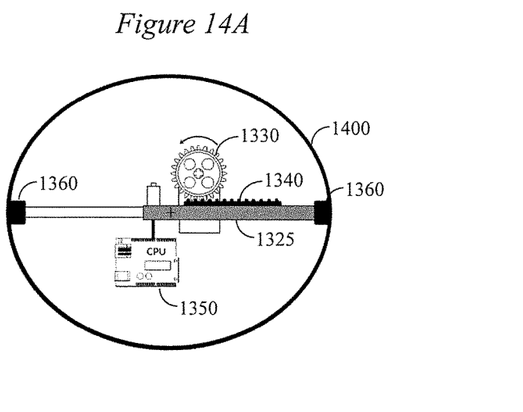
FIGS. 14A and 14B contain schematic illustrations of an embodiment in two different forms that illustrate that the robot center of mass, symbolized by a cross remains at the axis of the outer surface cylinder regardless of shape. In FIG.
Figure 14B:
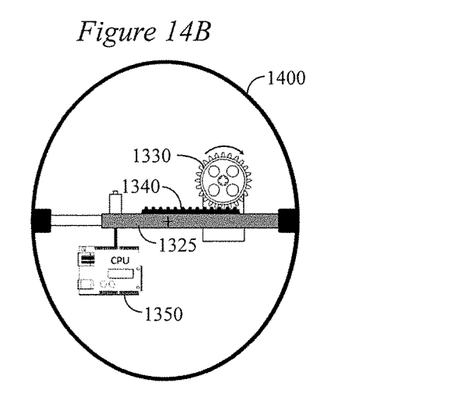

By way of a specific example, the outer surface of the rolling robot is a flat, 0:318 cm by 5:1 cm, strip of polyvinyl chloride plastic put into the shape of an open, elliptical cylinder with a perimeter of 2:10 m (FIGS. 1, 14A, and 14B). The cylinder is firm enough to provide a steady, dynamic roll surface for the robot yet limber enough to be significantly reshaped by the pull of a servomotor located inside the volume of the cylinder. On a smooth and level floor, the robot rolls in one direction along a straight path without leaning to the side or tipping over. Thus, the robot has three degrees of freedom: two degrees of translation in the horizontal-vertical plane and one degree of rotation about an axis perpendicular to the plane. Total mass of the robot is 832 g.

Figure 15:
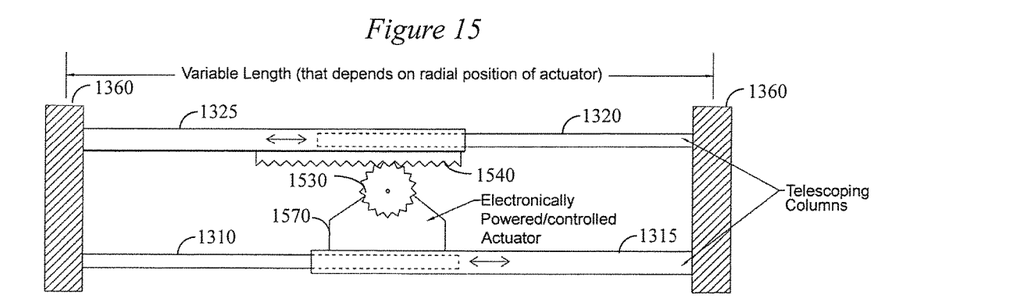
FIG. 15 contains a schematic illustration of another embodiment of the dual telescoping linear actuator.

Continuing with the current example, contained onboard the robot and inside the cylindrical outer surface are a central processing unit (CPU), inertial measurement unit, battery, mechanical switches and a linear actuator. Shape change of the robot is achieved via the linear actuator 1300, embodiments of which are illustrated in FIGS. 13, 14, and 15. The actuator 1300 possesses two sets of telescoping columns comprised of interlocking male 1310/1320 and female 1315/1325 aluminum tubes, with the male and female tubes being laterally movable with respect to each other. The tubes are secured by end-joints 1360 that are epoxied or otherwise in mechanical communication with the inside of the outer surface 1400.

A servomotor 1370 with a pinion gear 1300 is mounted (permanently or removably) to the female tube 1315 of one telescoping column, and a rack gear 1340 that meshes with the pinion gear 1330 is fastened to the female tube 1325 of the other column. As the motor 1370 turns, the pinion gear 1330 displaces the rack gear 1340, causing the end-joints 1360 to move away from (or towards) each other and thereby changing the outer surface shape, as illustrated in FIGS. 14A and 14B. When the actuator is not active, its static holding force keeps the outer surface stiff.

In this example a gyroscope board is fastened to the pinion column of the linear actuator, and the CPU and battery are fastened to the rack column. Alternatively, a 3D accelerometer or similar device might be used. Collective mass of the components connected to the rack column is approximately equal to the collective mass of the components connected to the pinion column; and these component sets are fastened in such a way so their centers of mass are radially opposed with reference to the axis of the outer surface cylinder, regardless of elongation of the actuator. Consequently, the robot's center of mass remains approximately at the same location at the axis of the cylinder—even as the robot changes shape, as illustrated in FIG. 14. While a constant center of mass location is not necessary for gravity-induced locomotion of the robot, it allows the robot's motion to be rotationally consistent and simpler to model and predict.

The pinion gear 1330 is fixed relative to the left end joint 1360 in FIGS. 14A and 14B. In some embodiments, it will be immovably affixed to the female member 1315 as is generally indicated in FIG. 15. Thus, when the servomotor 1370 turns the pinion gear 1330 counterclockwise, the telescoping columns push-out against the outer surface 1400 of the rolling robot, thereby tending to flatten it as it indicated in FIG. 14A. As the pinion gear 1330 turns clockwise, the telescoping male components 1320/1310 are drawn back into the female components 1315/1325, thereby shortening the overall length of the device 1300 and drawing the outer surface 1400 into a shape that tends to resemble the vertically oriented egg-shape of FIG. 14B. Note that FIG. 14 presents a side view of the embodiment of FIG. 13.

In FIG. 15, the pinion gear 1530 is positioned between the two extendable columns rather than atop them. In that case, the rack gear 1540 will need to be similarly positioned between the columns, as is at least a portion of the servomotor 1570.

As is indicated in the embodiments of FIGS. 14A and 14B, a CPU 1350 will be provided in order to implement the control mechanism disclosed herein. This CPU 1350 will be in electronic communication with sensors that measure at least the current tilt (angular position/orientation) of the robot and its angular (or lateral) velocity and then use those parameters to expand or contract the shape of the robot as discussed below.

In recent years, advances in sensor technology have made it possible for robots to accurately measure their states using sensors that are extremely lightweight, low-power and inexpensive. One such advanced sensor is STMicroelectronics™ L3GD20 angular rate sensor, a 3-axis micro-electrical mechanical gyroscope employed onboard the rolling robot in a coin-sized IMU breakout board. The board is powered by 3.3 v and communicates with the CPU via a two-pin I2C bus. The L3GD20 gyroscope is factory calibrated and has a 16 bit-rate data output with a full-scale limit of 500 degrees per second. According to ST Microelectronics™, the L3GD20 is insensitive to linear acceleration and vibration acting on the gyroscope as it measures angular rate.

According to another embodiment, the angular position of the robot can also be measured using four mechanical snap-action switches, fastened to the inside of the robot's outer surface, that are activated by rotating a spring-loaded lever arm. When not activated, the switch lever arm extends beyond the outer surface, so that as the robot touch point converges upon the position of a switch, the lever arm gently presses against the roll surface until the switch is activated. As the robot continues to roll beyond the activation touch point, the switch moves up and away from the roll surface, and spring action of the lever arm eventually causes it to snap back to its default, inactivated position. The four mechanical switches are part of an electrical circuit with a digital voltage line that's read by the onboard CPU. The circuit is designed so that when all four switches are in the default position, voltage in the digital line is high. However, when one of the switches meets the roll surface and is activated, voltage in the digital line momentarily goes low. The switches are positioned along the outer surface in a manner such that activation occurs when roll angle of the robot is approximately equal to −75 deg minus multiples of 90 deg. In summary, by keeping track of when and how many times switch activation occurs, roll angle is approximately established at −75; −165; −255; −345; −435, etc., as long as initial position is known.

Rolling Robot Control System

In one embodiment, the automatic control system for the rolling robot utilizes roll angle and angular velocity ($\theta$ and $\dot{\theta}$, respectively) as feedback variables. One goal of this particular control system is to cause the robot, starting from an initial condition, to reach and maintain a prescribed step angular velocity. This goal is achieved through one controlled action: changing the length of the linear actuator as the robot rolls, which in turn changes shape of the robot's outer surface. When this shape-change is strategically timed and executed, the robot's motion is repeatedly affected in a way that is similar to how an egg rolls when it's placed on end.

Shape-change actuation is triggered when one of the mechanical switches is activated. In other words, when a branch of A or B (FIG. 4) leans into the roll and passes a trigger inclination, the linear actuator is put into action by the control system. The linear actuator extends or contracts, and the robot's shape is changed. Upon completion of the shape-change actuation, the linear actuator remains at the newly changed length until actuation is once again triggered by activation of the subsequent switch. For discussion purposes, three concepts associated with this control process are designated: the axis whose position triggers actuation is the trigger axis; the axis positioned perpendicularly from the trigger axis is the sheer axis; and moments when actuation is newly triggered are called trigger moments. Every quarter turn of the robot, axes A and B switch positions (sheer/trigger) at the trigger moment. The sheer axis is thus named due to its consistently upright position; when actuation comes to completion, the sheer axis is about to pass or has just passed through the vertical.

Figure 4:
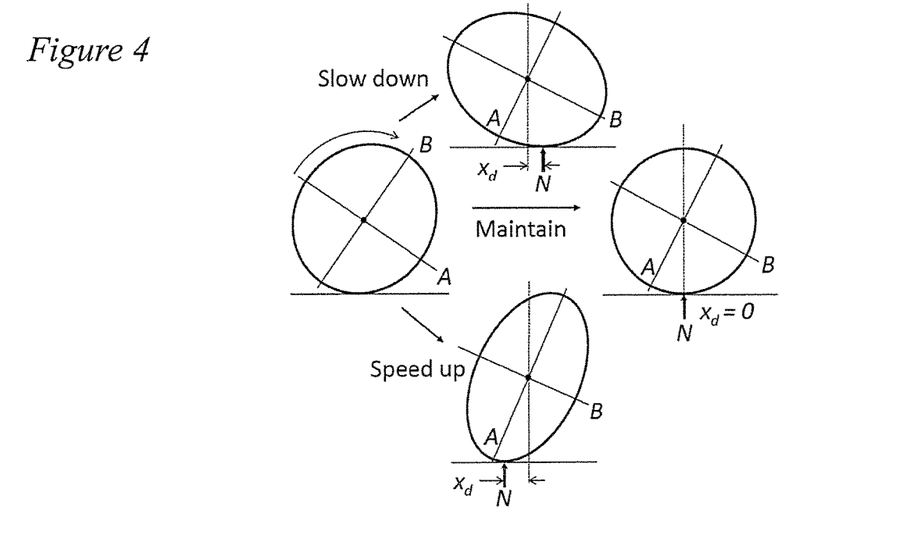
FIG. 4 contains a schematic diagram of an embodiment that shows the leftmost ellipse is rolling to the right when a branch of B triggers actuation. Approximately one-quarter turn later, after actuation is complete, three scenarios are shown. If a has been shortened (as in the upper ellipse), torque due to N acts to resist the robot's motion. If a has been elongated (lower ellipse), torque due to N pushes the robot along. If a stays nearly the same length, the robot maintains its approximate average speed.

To understand how this shape-change affects speed of the robot, consider the illustration in FIG. 4, in which the rolling robot is shown rolling to the right when a mechanical switch is activated. In response to the activation, the control system begins changing the linear actuator length along A (the sheer axis in this case), and outer surface eccentricity changes as the robot continues to roll to the right. Roughly a quarter-turn after actuation commences, two scenarios are considered. If a has been made long as A leans into the roll, the robot experiences an induced torque imbalance that pushes the robot forward, as illustrated by the lower ellipse in FIG. 4. On the other hand, if a has been made short, the resulting torque imbalance acts to brake or decelerate the robot's motion, as illustrated by the upper ellipse in FIG. 4. If a is changed so that ellipse eccentricity is equal to one, there is no resulting torque imbalance due to offset, and the robot's average speed is approximately maintained.

Robot Model and Equations of Motion

An embodiment of a rolling robot has been developed that changes shape of its flexible outer surface in order to drive itself. Shape change is achieved in this embodiment via a linearly actuating spoke that connects sides of the outer surface along its diameter. Onboard sensors measure the robot's roll angle and the time derivative of the roll angle, which are fed back to an onboard computer and used in control algorithms to actuate the spoke and morph the outer surface. When the spoke is not actuating, its static holding force keeps the outer surface firm.

Figure 2:
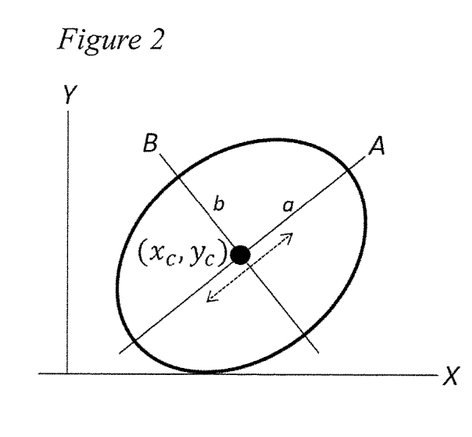

The outer surface is modeled as an ellipse with varying eccentricity that rolls along a straight line in the horizontal-vertical plane. A laboratory-fixed Cartesian coordinate frame, XY, is established as the roll plane with X as the ground line. A moving coordinate frame, AB, is attached concentrically to the ellipse and rolls with it. Axis A is placed along the actuating spoke's line of motion. Lengths a and b of elliptical semi-major axes are measured along A and B. A point mass representing hardware components is fixed at the origin of AB, which is also the center of mass, $(x_c, y_c)$, of the robot. An illustration of an embodiment of a two-dimensional model rolling robot situated in the XY coordinate frame is shown in FIG. 2.

Figure 3:
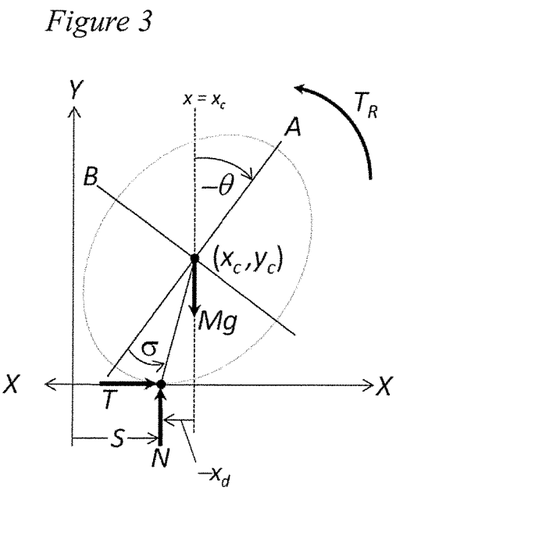
FIG. 3 contains a schematic illustration of a robot geometry and free body diagram for an embodiment. Robot center of gravity location is $(x_c, y_c)$. S is the position of the touch point on X. Roll angle, $\theta$, is defined by the positive branch of A and the vertical. Three forces are shown: weight, normal force and traction. Rolling resistance torque, TR, opposes roll motion of the robot.

A free body diagram for the model robot with geometric parameters that are used to develop the equations of motion are shown in FIG. 3. The point where the ellipse makes contact with X is designated as the touchpoint, and its position on X is S. Horizontal position of the touchpoint with respect to (xc, yc) is xd. The angle defined by the positive branch of A and the vertical line passing through xc as shown in FIG. 3 is the roll angle of the robot, $\theta$. Touch angle, $\sigma$, is the angle relative made by the A axis and the line from $(x_c, y_c)$ to the touchpoint. Touch angle is related to the roll angle by the following equation:

$$\sigma = \arctan\left(\frac{x_d}{y_c}\right) - \theta \quad (1)$$

Normal force, N, pushes upward on the robot at the touchpoint. Traction, T, also acts at the touchpoint but in the horizontal direction. Rolling resistance torque, TR, opposes roll motion of the robot. It is caused by deformation of the outer surface tread that bunches-up in front of the robot as it rolls along [11].

Newton's second law is applied in the horizontal and vertical directions and also about the center of gravity, resulting in three coupled differential equations of motion:

$$T = M\ddot{x}c \quad (2)$$

$$N - Mg = M\ddot{y}c \quad (3)$$

$$Tyc + Nxd + TR = \dot{H} \quad (4)$$

where M is the mass of the robot, and H is angular momentum of the robot about its center of gravity. Equations 2 through 4 are combined into a primary equation of motion:

$$My_c\ddot{x}_c + Mx_d\ddot{y}_c + Mx_d g + TR = \dot{H} \quad (5)$$

Robot Control System

An embodiment of the automatic control system for the an embodiment of the rolling robot utilizes angular position and angular velocity of the robot as feedback variables. A goal of the control system in this embodiment is to cause horizontal velocity of the OSU rolling robot, $\dot{x}_c$, to follow a desired velocity profile. This goal is achieved through one controlled action: changing position of the linear actuating spoke as the robot rolls, which in turn changes shape of the robot's outer surface. When this shape-change actuation is strategically timed and executed, the robot's motion is affected in a way that is comparable to how an egg rolls when it's placed on end.

The timing of the shape-change actuation is based on a trigger condition:

$$rem\left(\theta, \frac{\pi}{2}\right) < \theta_t \quad (6)$$

that is checked at every quarter-turn of the robot, where $\theta_t$ is a chosen trigger angle. For the study herein, $\theta_t$ has been chosen as −75 degrees. Thus, actuation of the spoke potentially commences when angular position of a branch of A or B leans into the roll and passes a 75 degree inclination. For discussion purposes, moments when the trigger condition is met are herein referred to as trigger moments. In addition, the axis whose position triggers actuation is designated as the trigger axis, and the axis positioned $\pi/2$ rad counter-clockwise relative to the trigger axis is designated as the sheer axis. Axes A and B switch positions in these axes every quarter turn. Referring to the orientation of the robot in FIG. 3, the trigger axis is A, and the sheer axis is B. The sheer axis is so named due to its upright position; when actuation comes to completion, the sheer axis is about to pass or has just passed through the vertical (as long as the ellipse is not rotating too quickly).

Length of the sheer semi-major is shortened or elongated in proportion to error, defined by $$E = \dot{x}_c(t) - (1 + k_{ss})v_d(t + \Delta t),$$

or, in terms of angular velocity, $$E = k_{ss}\dot{\theta}_d(t) - \dot{\theta}(t) \quad (7)$$

where $v_d$ is a desired velocity profile, and $k_{ss}$ is a constant that magnifies the desired velocity to compensate for the constant slowing of the robot due to rolling resistance torque. The most noticeable control effect of $k_{ss}$ is to change the average value of $\dot{x}_c$ at steady-state. The value, $\Delta t$, is a time-shift of the desired velocity that causes error to be computed according to a future value of $v_d$. This shift acts to decrease error lag. As the robot does not possess a sensor that reports x'c directly, this value must be computed using only information that is available to the robot's onboard computer through sensor measurement: $\theta$, $\dot{\theta}$, a, b, $\dot{a}$ and $\dot{b}$. As long as no slipping occurs between the robot's outer surface and the rolling surface, computation of $\dot{x}_c$ is carried out through the following equation:

$$\dot{x}_c = \dot{S} - \dot{x}_d \quad (8)$$

where S is the location of the touchpoint on X, and it is equivalent to the elliptical arc length integrated over roll angle, plus a constant value [12]:

$$S = \int \sqrt{R^2 + (R')^2}\, d\sigma + \text{constant with} \quad (9)$$

$$R = \frac{ab}{\sqrt{a^2 \sin^2 \sigma + b^2 \cos^2 \sigma}} \quad (10)$$

$$R' = \frac{ab(a^2 - b^2)\sin\sigma\cos\sigma}{\sqrt{a^2 \sin^2 \sigma + b^2 \cos^2 \sigma}} \quad (11)$$

The time derivative of S, which is the needed parameter to compute $\dot{x}_c$ and ultimately error in Equation 7, is found by differentiating Equation 9 using the "differentiation under the integral" rule [13], giving:

$$\dot{S} = \dot{\sigma}\sqrt{R^2 + (R')^2} \quad (12)$$

where $\dot{\sigma}$ is found by taking the time-derivative of Equation 1

$$\sigma = \frac{1}{1 + (x_d/y_c)^2} \frac{y_c\dot{x} - x_d\dot{y}_c}{y_c^2} \quad (13)$$

After error is computed, an intermediary value of the target length for the sheer semi-major axis is computed.

$$l_t = \frac{(s_{max} + s_{min})}{2} - kE \quad (14)$$

Where $s_{max}$ and $s_{min}$ are the maximum and minimum values of the semi-major axes of the ellipse. Note that if E is equal to zero in Equation 14, the control system causes the ellipse to take the form of a circular cylinder in order to approximately maintain its velocity. If E is positive (the robot is moving too fast), the control system prepares to shorten the sheer semi-major axis. If error is negative (the robot is moving too slowly), the control prepares to elongate the sheer semi-major axis. Since rolling torque resistance constantly acts to slow the rolling robot, these two error scenarios must be treated individually; in order to brake/decelerate the robot when it's going too fast, a small elongation of the ellipse suffices, whereas to speed-up the robot when it's going too slow, a relatively large elongation is needed. So then, separate constants are used to calculate target length of the sheer semi-major axis—one for braking ($k_b$) and another for speeding-up ($k_{su}$):

$$k = \begin{cases} k_{br} & \text{if } E > 0 \\ k_{su} & \text{if } E < 0 \end{cases} \quad (15)$$

Finally, target length of the sheer semi-major axis is computed according to a saturation operation that ensures the ellipse stays within the physical bounds of the system:

$$L_t = \begin{cases} s_{min}, & \text{if } l_t < s_{min} \\ l_t, & \text{if } s_{min} < l_t < s_{max} \\ s_{max}, & \text{if } l_t > s_{max} \end{cases} \quad (16)$$

Since the actuating spoke lies along A, if A is the sheer axis, then the control system moves the linear spoke so that a elongates to $L_t$. This actuation is performed according to a triangular velocity profile of duration $t_a = 0.50$ s. Integrating the profile with respect to time gives a as a function of time:

$$a(t) = \quad (17)$$

$$\begin{cases} a_i + \dfrac{V_m}{t_a}(t - t_i)^2, & \text{if } t_i < t \le t_i + \dfrac{t_a}{2} \\ -\dfrac{V_m}{t_a}(t - t_i)^2 + 2V_m(t - t_i) + \dfrac{2a_i - V_m t_a}{2}, & \text{if } \dfrac{t_a}{2} + t_i < t \le t_a + t_i \end{cases}$$

where $t_i$ is time when actuation commences, $l_i$ is the value of a when actuation commences, and $V_m = 2(L_t - l_i)/t_a$. If B is the sheer axis, then the control system actuates A so that b elongates to $L_t$. In this case, $$b(t) = \quad (18)$$

$$\begin{cases} b_i + \dfrac{V_m}{t_a}(t - t_i)^2, & \text{if } t_i < t \le t_i + \dfrac{t_a}{2} \\ -\dfrac{V_m}{t_a}(t - t_i)^2 + 2V_m(t - t_i) + \dfrac{2b_i - V_m t_a}{2}, & \text{if } \dfrac{t_a}{2} + t_i < t \le t_a + t_i \end{cases}$$

where $b_i$ is the value of b when actuation commences, and $V_m = 2(L_t - b_i)/t_a$. The Ramanujan approximation [12] is applied to compute a as a function of time for actuation of A:

$$a(t) = \frac{8b - 6P/\pi}{12} + \frac{1}{12}\sqrt{(8b - 6P/\pi)^2 - 24(P^2/\pi^2 - 6Pb/\pi + 6b^2)} \quad (19)$$

where P is ellipse circumference. In Equations 17 and 18, time duration of the profile is computed as a function of the relative magnitude of actuation length:

$$t_a = 4|a_i - L_t| + 0.12 \quad (20)$$

Simulation of Robot Performance

In order to predict motion of the robot in response to a proposed control strategy, it is helpful to solve Equation 5 using a computer program, so that response parameters can be plotted and evaluated. This section describes how the numerical algorithm solves the equation of motion. First, it is necessary to understand how the variables in Equation 5 ($\dot{H}$, $\ddot{x}c$, $yc$, $xd$, $\ddot{y}c$, and $Tr$) are handled in the algorithm.

Horizontal Velocity of Center of Gravity, $\dot{x}c$

The simulation finds $\dot{x}c$ using Equation 8, and then differentiates numerically with respect to time to compute $\ddot{x}c$.

Time-Derivative Of Outer Surface Angular Momentum, $\dot{H}$

Figure 5:
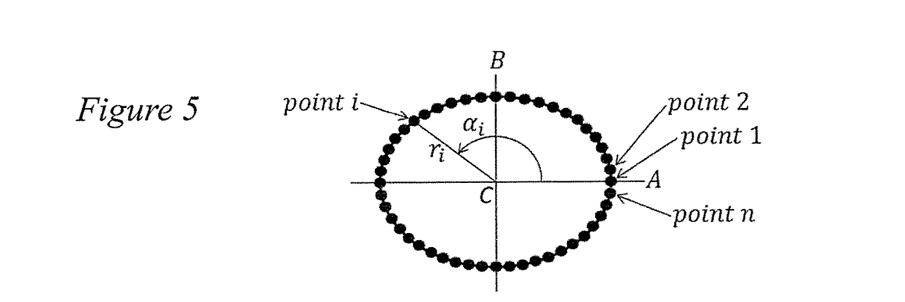
FIG. 5 contains an embodiment of a calculation of the momentum about C of a robot's outer surface, which is modeled as a collection of n points, each with mass of $m_p = m_s = n$, where $m_s$ is mass of the outer surface. Polar angle of point mass i in AB is $\alpha_i$, and its distance from the origin of AB is $r_i$.

The outer surface of the robot is treated in the simulation as a collection of n points with even radial spacing, as illustrated in FIG. 5, regardless of the elliptical shape of the outer surface. This approximation is valid, as long as the elliptical outer surface is thin and its eccentricity remains close to one—both of which are true. Mass of each point is $m_p = m_s/n$, where $m_s$ is mass of the outer surface. The point masses are indexed as $1 < i < n$ with polar placement on AB expressed as:

$$\alpha_i = 2\pi(i-1)/n \quad (21)$$

and $$r_i = \frac{ab}{\sqrt{a^2 \sin^2 \alpha_i + b^2 \cos^2 \alpha_i}} \quad (22)$$

The time derivative of angular momentum for point mass i about the robot's center of gravity is $$\dot{H}_i = m_p r_i^2 \ddot{\theta} + 2 m_p r_i \dot{\theta} \dot{r}_i \quad (23)$$

with $$\dot{r}_i = \frac{(a\dot{b} + b\dot{a})(ab/r_i)^2 - ab(a\dot{a}\sin^2\alpha_i + b\dot{b}\cos^2\alpha_i)}{(a^2\sin^2\alpha_i + b^2\cos^2\alpha_i)^{3/2}} \quad (24)$$

For the collection of n point masses that comprise the robot's outer surface, time derivative of angular momentum about the robot's center of gravity is calculated by summing contributions from n point masses. Thus, $$\dot{H} = \rho_1 \ddot{\theta} + \rho_2 \dot{\theta} \quad (25)$$

where the following simplifications have been made:

$$\rho_1 = \sum_{i=1}^{n} m_p r_i^2 \quad (26)$$

$$\rho_2 = \sum_{i=1}^{n} 2 m_p r_i \dot{r}_i \quad (27)$$

Positions xd and yc

The X-axis is equivalent to the tangent line of the ellipse at the touchpoint. This observation leads to the following expressions:

$$x_d = \frac{(a^2 - b^2)\cos\theta \sin\theta}{\sqrt{a^2\cos^2\theta + b^2\sin^2\theta}} \quad (28)$$

$$y_c = \sqrt{a^2\cos^2\theta + b^2\sin^2\theta} \quad (29)$$

The numerical derivative of $y_c$ is performed twice to obtain $\ddot{y}_c$.

Rolling Torque Resistance, $T_R$

Rolling resistance torque is modeled as [11]:

$$T_R = k_R N \text{sign}(\dot{S}) \quad (30)$$

where $k_R$ is constant, and $\dot{S}$ is computed in the simulation using Equations 10 through 13. In order to determine the appropriate value of $k_R$, an embodiment of a rolling robot was fixed in an elliptical shape and given a set of initial conditions that caused it to roll forward, settle into a rocking motion and eventually stop. Time duration of the motion was recorded. Afterwards, the simulation was run using the same initial conditions, and values of $k_R$ were iteratively used in the program until stopping time matched the roll of the actual robot. Using this method, the value of $k_R$ was found to be 0.003.

The Solver Program

Equation 5 can be rewritten as:

$$\ddot{\theta} = \frac{1}{\rho_1}(-\rho_2 \dot{\theta} + M y_c \ddot{x}_c M x_d \ddot{y}_c + M x_d g + T_R) \quad (31)$$

One strategy that can be employed to solve Equation 31 is to run a numerical algorithm that numerically integrates twice by means of a looping mechanism to obtain $\dot{\theta}(t)$ and $\theta(t)$. At each step of the loop, this embodiment of the program integrates to update $\theta$, numerically differentiates to update $\ddot{y}$, $\ddot{x}d$, and checks to determine if actuation has been triggered. If actuation has been triggered, a and b change at subsequent steps according to the motion profiles given above. Otherwise a and b do not change. In either case, updated values of $\theta$, $\dot{\theta}$, a, b, $\dot{a}$ and $\dot{b}$ are computed, and these values are "looped-back" to update values on the right side of Equation 31, and the process is repeated. In this way, motion parameters of the robot, including $\theta$, are computed as functions of time.

Program Runs and Results

Figure 6:
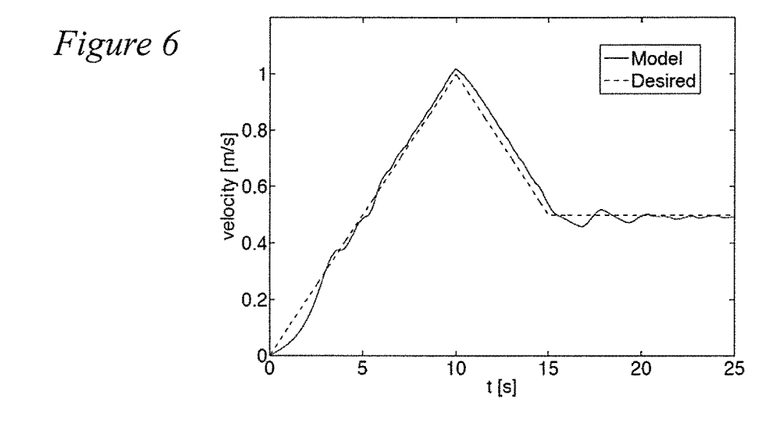
FIG. 6 contains an example plot of horizontal velocity, $\dot{x}_c$, plotted versus time for Run 1. Desired velocity, $v_d$, is shown by a dotted line.
Figure 10:
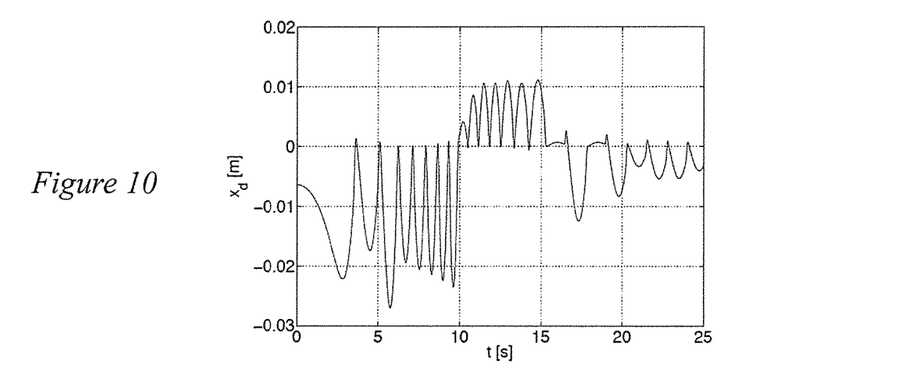
FIG. 10 contains plot of $x_d$ versus time for a Run 1 embodiment.
Figure 11:
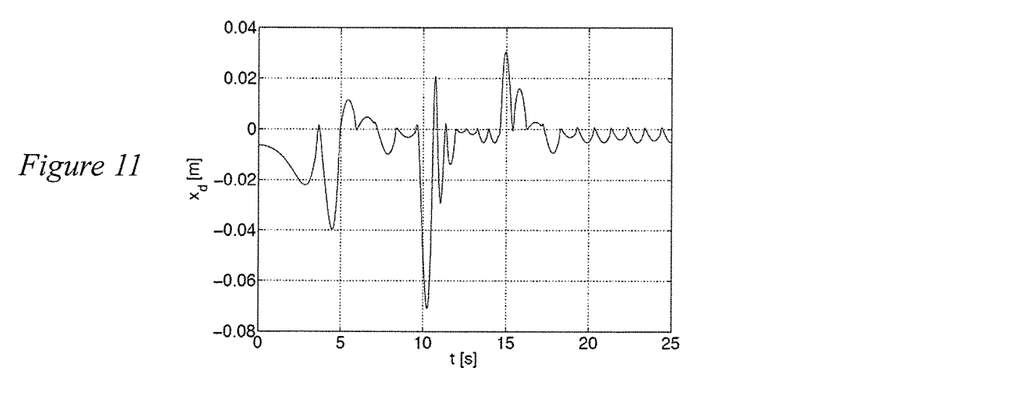
FIG. 11 contains a plot of $x_d$ versus time for a Run 2 embodiment.
Figure 12:
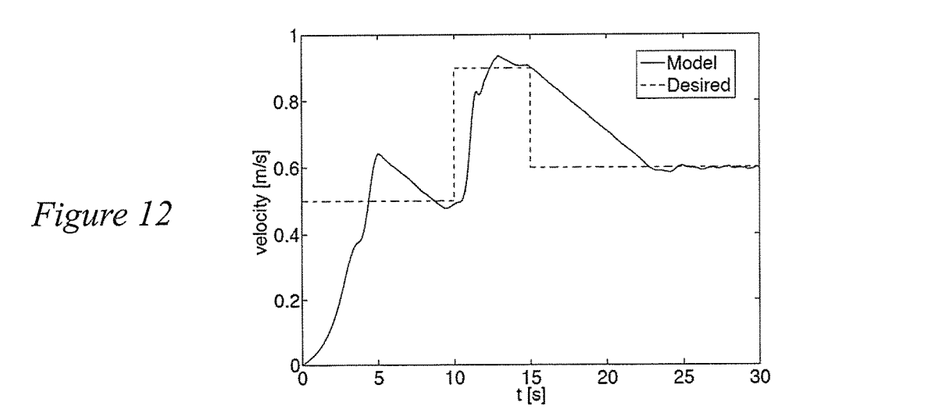
FIG. 12 contains a plot of horizontal velocity, $\dot{x}_c$, versus time for a Run 2 embodiment without braking control ($k_{br} = 0$).

Continuing with the present embodiment, the solver is run twice to simulate controlled motion of the rolling robot corresponding to two desired velocity profiles. Run 1 corresponds to a triangular profile as shown in FIG. 6, and Run 2 corresponds to the step profile shown in FIG. 7. Velocity of the center of gravity of the robot, ẋc, for the runs is also plotted versus time in these figures. Length of semi-major axis, a, is plotted versus time for the runs in FIG. 8 and FIG. 9, and FIGS. 10 and 11 show xd versus time for Run 1 and Run 2, respectively. FIG. 12 shows a plot of ẋc versus time for Run 2 without braking control (kb=0). Initial conditions for the runs are: θ(0)=−0.15 rad, θ̇(0)=0 rad/s, a(0)=0.40 m and b(0)=0.38 m. Model parameters used in the solver for the runs are given in Tab. 1. The following constants are used for the runs: $k_{su}$=0.13 s, $k_{br}$=0.05 s, $k_{ss}$=0.04, Δt=1 s and n=40.

TABLE 1

Robot Physical parameters

| | |
|---|---|
| M | 0.832 kg |
| $m_s$ | 0.52 kg |
| $m_{ip}$ | 0.094 kg |
| $m_{op}$ | 0.015 kg |
| $m_t$ | 0.008 kg |
| $d_{ip}$ | 0.36 m |
| P | 2.10 m |
| N | 40 |
| $s_{max}$ | 0.349 m |
| $s_{min}$ | 0.318 m |
| β1 | 75 deg |
| β2 | 165 deg |
| β3 | 255 deg |
| β4 | 345 deg |

For Run 1 the triangular velocity profile seen in FIG. 6 requires the robot to speed-up on average during the first ten seconds of the run. Recall from the roll scenario illustrated in FIG. 4 that negative values of $x_d$ cause torque imbalance that speeds up the robot. The control system therefore causes an aggressive actuation pattern, as observed in FIG. 8, that results in high magnitude, negative values of $x_d$ (FIG. 10). After ten seconds into the run, desired velocity changes from an increasing line to a line with negative slope, and the robot decelerates. It's easier for the robot to slow down than to speed-up, due to rolling resistance torque that constantly burdens roll motion of the robot. Consequently, the deceleration actuation pattern in FIG. 8 after ten seconds is not as aggressive in comparison to the acceleration pattern. Note that in FIG. 10, the value of $x_d$ after ten seconds flips from being characteristically negative to being positive—a change that reflects deceleration (braking) of the control system. After 15 seconds into the run, desired velocity becomes constant. The control system causes slight undershoot of the target velocity, and about five seconds is required for the velocity to settle.

Figure 7:
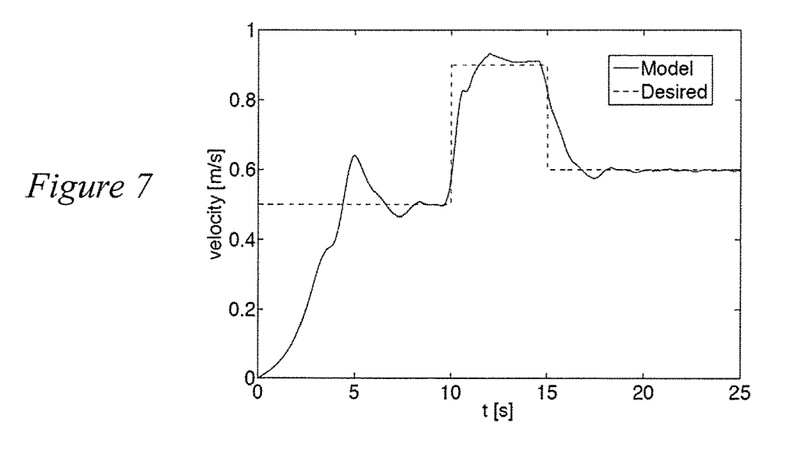
FIG. 7 contains an illustration of horizontal velocity $\dot{x}_c$, plotted versus time for Run 2. Desired velocity profile is shown with dashed segments.
Figure 8:
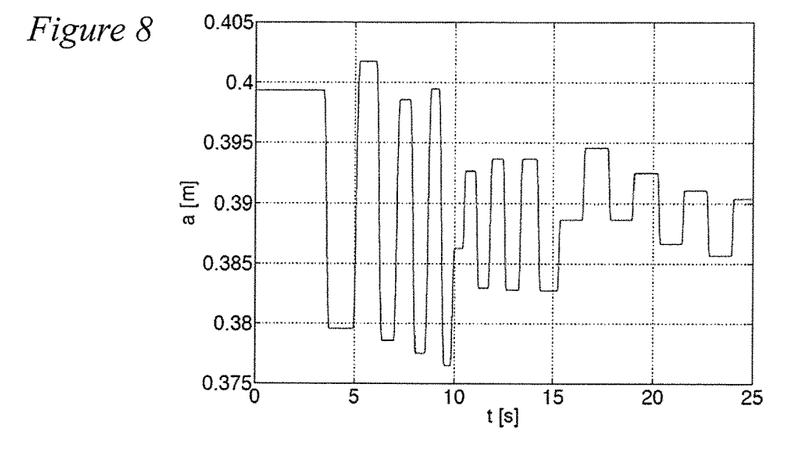
FIG. 8 a schematic illustration of the length of semi-major axis, a, plotted versus time for Run 1 according to an embodiment.
Figure 9:
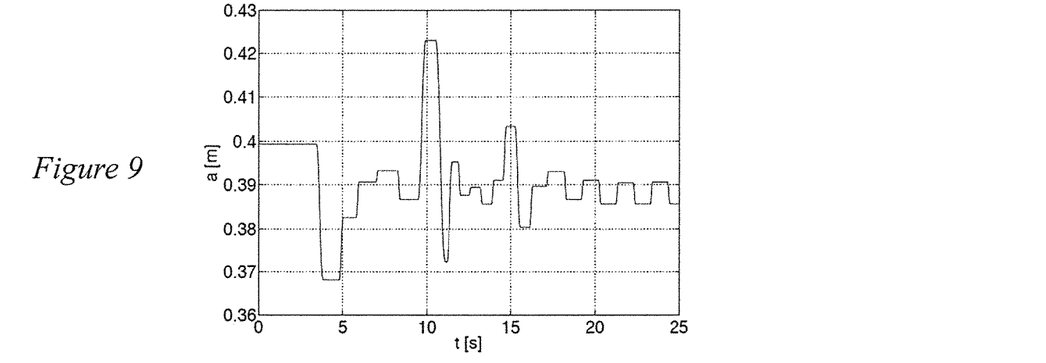
FIG. 9 contains an exemplary embodiment of a length of semi-major axis, a, plotted versus time for Run 2 according to an embodiment.

For Run 2, desired velocity in FIG. 7 immediately steps from zero to 0.5 m/s, which causes the value of E in Equation 7 to suddenly become a relatively large, negative number. Accordingly, the control system causes the robot to aggressively actuate, as seen in FIG. 9, in order to speed-up and reduce the magnitude of E. Velocity overshoots by approximately 25% in response to this step. In order to reduce overshoot, kp can be changed, but similar to the behavior of a second order system with proportional control, there is a give-and-take relationship between rise time and overshoot relative to the proportional constant; when kp is reduced, velocity of the robot overshoots less but takes longer to reach the desired velocity. On the other hand, when kp is increased, the robot rises to the desired velocity faster but also overshoots more. At the step to 0.90 m/s in Run 2, velocity of the robot over-shoots only about 5%, but velocity stays high and does not settle exactly at the desired velocity. At 15 seconds into the run, desired velocity steps down to 0.6 m/s, and the control system causes the robot to decelerate by making xd positive, as seen in FIG. 11. The robot's velocity slightly undershoots as a result of this braking action yet quickly settles into the desired velocity. After 20 s, the system exhibits a steady state actuation pattern, in which the control system propels the robot just enough to counteract rolling resistance torque and maintain constant average velocity. Surprisingly, little actuation is needed to do so; for the steady state actuation pattern of Run 2 seen in FIG. 9, axes of the ellipse are extended/contracted by approximately one centimeter every quarter turn to maintain constant average velocity.

FIG. 12 shows a run whose set-up is identical to Run 2, except that kbr=0. Without braking control, the rolling robot fails to settle into the desired velocity near ten seconds. More significantly, without braking control, the robot takes nearly six seconds longer, as compared to Run 2 with kb=0.5, to reach steady state after the desired velocity step to 0.5 m/s.

By way of recap, a rolling robot has been developed with an elliptical outer surface that automatically changes eccentricity as it rolls along. A control system has been devised, in which angular position and angular velocity of the robot are used as feedback variables to alter lengths of the elliptical axes at strategic moments, creating torque imbalance that propels the robot or slows it down. Using a numerical algorithm that solves the system equations of motion, the robot is shown to follow a desired velocity profile with significant accuracy. The robot is able to accelerate from zero velocity, maintain constant average velocity and brake its motion.

Note that, as used herein, the term "elliptical" should not be construed to mean that various embodiments are not occasionally circular in cross section. In other words, as the outer surface is morphed it might, from time to time, might become circular or even not strictly elliptical as it's outer surface is deformed by the linear actuator.

Additionally, although various embodiments have utilized a dual telescoping linear actuator, that is only one approach to deforming the outer surface of the robot. Those of ordinary skill in the art will recognize that two separate linear actuators could be used to achieve similar results although the control algorithm might be different. Thus, for purposes of the instant disclosure the term "dual linear actuators" should be broadly construed to include a dual action linear actuator as well as two separate linear actuators.

Further, although certain embodiments utilize a flexible exterior surface that is, at least at times, generally cylindrical in shape, those or ordinary skill in the art will recognize that other shapes are certainly possible and would be operable within the teachings presented herein. As such, when the term "cylindrical" is used herein to describe the shape of the flexible shell that surrounds the actuation mechanism, that term should be used to describe the general shape of the outer surface prior to deformation by the linear actuators, with the understanding that it might not actually be a cylinder while locomotion is taking place.

Those of ordinary skill in the art will recognize how the foregoing might be extended to a three-dimensional rolling robot. As a specific example, the robot might be spherical with three dual action linear actuators set at right angles to each other. That would make it possible to use gravity to move the robot in a manner similar to that described above.

Note that if a microprocessor is utilized as a component of an embodiment, the only requirement that such a component must satisfy is that it must minimally be an active device, i.e., one that is programmable in some sense and that it is capable of recognizing signals from a sensor and responding thereto. Of course, these sorts of modest requirements may be satisfied by any number of programmable logic devices ("PLD") including, without limitation, gate arrays, FPGA's (i.e., field programmable gate arrays), PLA (i.e., programmable logic array), ASIC (i.e., application specific integrated chip), etc., as those acronyms and their associated devices are known and used in the art. Further, those of ordinary skill in the art will recognize that many of these sorts of devices contain microprocessors integral thereto. Additionally, those of ordinary skill in the art will recognize that discrete electronic components could be assembled to create a circuit that exhibits at least a portion of the operating function of the instant invention. Thus, for purposes of the instant disclosure the terms "processor," "microprocessor" and "CPU" (i.e., central processing unit) should be interpreted to take the broadest possible meaning herein, and such meaning is intended to include any PLD or other programmable device (to include custom circuitry formed from digital and/or analog components) of the general sort described above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.
Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:
1. A rolling robot, comprising:
(a) a flexible hollow cylindrical shell, said shell having an interior;
(b) a dual telescoping linear actuator positioned within said shell, said linear actuator comprising
(1) a telescoping rack column having a first end and a second end, said rack column having a rack gear attached thereto, said rack column spanning said interior of said shell, said first and second rack column ends being in mechanical communication with said shell,

(2) a telescoping pinion column having a first end and a second end, said pinion column, said pinion column spanning said interior of said shell, said first and second pinion column ends being in mechanical communication with said shell, (3) a pinion gear positioned to engage said rack gear, and, (4) a servomotor in mechanical communication with said pinion gear and with said pinion column, said servomotor at least for rotating said pinion gear to extend and contract said linear actuator;

(c) a first sensor for measuring an angular position of said shell;

(d) a second sensor for measuring a velocity of said shell; and, (e) a CPU in electrical communication with said first sensor, said second sensor, and said servomotor, said CPU reading signals from said first and second sensors and using said signals to direct said servomotor to expand or contract said linear actuator, thereby altering a shape of said cylindrical shell to effect lateral motion.

2. The rolling robot according to claim 1, wherein said rack column and said pinion column are parallel.

3. The rolling robot according to claim 1, wherein said servomotor is affixed to said pinion column.

4. The rolling robot according to claim 1, wherein said servomotor is an electric DC servo motor.

5. The rolling robot according to claim 1, wherein said first sensor and said second sensor are a same sensor.

6. The rolling robot according to claim 5, wherein said same sensor is a 3D accelerometer.

7. The rolling robot according to claim 1, wherein said first sensor is a gyroscope.

8. A dual telescoping linear actuator, comprising (a) a telescoping rack column having a first end and a second end, wherein said first end of said rack column terminates in a first end-joint, said second end of said rack column terminates in a second end-joint, and said rack column has a rack gear attached thereto;

(b) a telescoping pinion column parallel to said rack column, said pinion column having a first end and a second end, wherein, said first end of said pinion column terminates in said first end-joint, said second end of said pinion column terminates in said second end-joint;

(c) a pinion gear positioned to engage said rack gear, and, (d) a servomotor in mechanical communication with said pinion gear and with said pinion column, said servomotor at least for rotating said pinion gear to extend and contract said linear actuator.

9. The rolling robot according to claim 8, wherein said servomotor is affixed to said pinion column.

10. The rolling robot according to claim 8, wherein said servomotor is an electric DC servo motor.

11. A method of altering a movement condition of a rolling robot having a flexible elliptical exterior shell, said shell having two changeable elliptical axes associated therewith, comprising the steps of:

a. determining an angular position of said rolling robot with respect to said elliptical axes;

b. determining an angular velocity of said rolling robot;

c. using said angular position and said angular velocity to change a length of each of said two elliptical axes to create a torque imbalance in said robot, thereby changing said movement condition of said rolling robot.

12. The method of altering a movement condition of a rolling robot according to claim 11, wherein said changed movement condition is an acceleration of said rolling robot.

13. The method of altering a movement condition of a rolling robot according to claim 11, wherein said changed movement condition is a deceleration of said rolling robot.

14. The method of altering a movement condition of a rolling robot according to claim 11, steps (a) through (c) are performed a plurality of different times.

* * * * *